E. E. NOVOTNY.
COMPOSITE SHEET FOR MAKING MATRICES.
APPLICATION FILED OCT. 29, 1917.

1,377,512.

Patented May 10, 1921.

Inventor,
Emil E. Novotny.
By his Attorneys,
Meyers, Cushman & Rea

UNITED STATES PATENT OFFICE.

EMIL E. NOVOTNY, OF PHILADELPHIA, PENNSYLVANIA.

COMPOSITE SHEET FOR MAKING MATRICES.

1,377,512. Specification of Letters Patent. Patented May 10, 1921.

Application filed October 29, 1917. Serial No. 198,975.

*To all whom it may concern:*

Be it known that I, EMIL E. NOVOTNY, a citizen of the United States, residing at Olney, Philadelphia, in the county of Philadelphia and State of Pennsylvania, have invented new and useful Improvements in Composite Sheets for Making Matrices, of which the following is a specification.

This invention relates to the production of a sheet or mat for use in the manufacture of matrices and printing plates used in the printing art.

Briefly, I propose to make a sheet or mat of a metallic foil comprising preferably approximately equal proportions of tin and lead and to treat and operate upon this foil by my novel method so as to rapidly and economically produce matrices and printing plates embodying the finest detail as to grain and the like. In some instances, this foil sheet may be provided with a backing sheet of suitable material, although this is not absolutely necessary.

It has been found that one of the difficulties incident to the production of printing plates from a phenolic substance which hardens and sets under heat and pressure, or heat, pressure, and cooling, and of which substance bakelite and condensite are examples, is that such phenolic substance in the molding or casting of the plate is liable to stick or adhere to the operative face of the matrix. Heretofore I have obviated this particular objection by making this operative face of the matrix mat of a sheet of metal capable of readily taking an impression and possessing a certain degree of flow under heat and pressure, preferably employing lead foil, tin foil, or an alloy of these for this purpose. I have discovered, however, that where the foil facing sheet, whether backed or unbacked, is composed solely of lead, or solely of tin, relatively great pressure is necessary in forming the molding face of the matrix when the foil sheet is in contact with a body of type or the like, and the result is that there is danger of smashing or breaking down the type, or causing the impression to appear at the back of the foil sheet, much after the manner of an embossing, in addition to the great defect that for fine work, such as half tones, or the like, the proper grain or detail will not appear on the molding face of the metallic or foil sheet, although the use of the metallic facing sheet as above indicated subsequently avoids the sticking of the plate material to the matrix. After a prolonged series of experiments I have discovered that by making the foil sheet of an alloy in certain proportions, and heating the same during the making of the matrix or plate to a certain degree of temperature I am enabled not only to dispense with the employment of a relatively great pressure, thus obviating the liability of breaking down or injuring the type, or original type matter employed for instance, for making the matrix but I attain the finest results as to the reproduction of detail, grain and the like with the employment of a relatively low degree of heat, and furthermore, little or no embossing effect appears at the back of the foil sheet. I have found that I may successfully use pressures as low as, or even lower than ordinary printing pressure, for instance from seventy-five to one hundred pounds. I have also discovered that by treating the composition sheet, or a sheet of foil provided with a backing with a catalytic agent I may so speed up the process of making the article as to greatly shorten the time ordinarily required for this purpose. For instance, I am enabled thus to make a matrix or plate in say two minutes, where heretofore I have required fifteen minutes to make a matrix of this general type.

In describing my invention I will use the making of a matrix merely by way of illustration.

Figures 1, 2, 3:
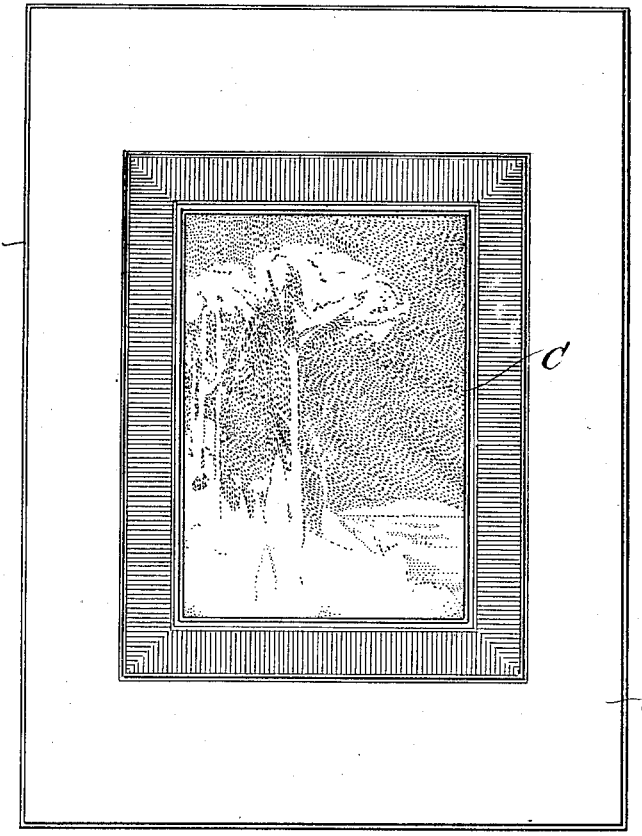
Figure 1 is a plan view of a complete matrix embodying my invention and showing the molding or operative face thereof.
Fig. 2 is a cross sectional view taken through the metallic foil or facing sheet of the matrix.
Fig. 3 is a similar view taken through the complete matrix, that is through the foil facing and backing sheet thereof.

Referring to the accompanying drawings in detail, it will be noted that the mat from which the matrix is made is in the nature of a composite mat and embraces a backing sheet A, and a foil facing sheet B, the object or impression produced from a body of original type, or a plate, being shown in Fig. 1 at C. Of course the backing sheet may be omitted if desired.

In the manufacture of this matrix I preferably employ a backing sheet A which is composed of a body of absorbent, preferably fibrous material, such as blotter board or the like. This backing sheet A is preferably first impregnated with a phenolic condensation product in solution with a volatile liquid such as alcohol. The backing sheets so impregnated with the phenolic solution may be kept in stock. When desired for use, for instance in making the matrix, I saturate this impregnated fibrous backing sheet with a solution of water and a catalytic agent, such as chlorid of zinc, as I have found that the use of chlorid of zinc in this connection preferably applied about the time the article is to be made will cause the backing sheet to more quickly harden and set under heat and pressure, or heat, pressure and cooling in making the matrix; and that this setting will take place at a lower temperature than where the backing sheet is merely impregnated with the phenolic condensation material and then saturated with plain water, as is set forth in my co-pending application, Serial No. 185,712. For instance, as above indicated, the fibrous backing sheet saturated with a solution of water and chlorid of zinc, or a like catalytic agent, will harden and set in about one-seventh of the time required for the hardening and setting of the backing sheet made and treated, as set forth in my application aforesaid. The metallic foil, or faccing sheet B employed in connection with this backing sheet I preferably make from a metallic alloy, such as tin and lead, varying from equal parts, or 50% each to say 68%, one or the other. I make use of alloys of these proportions because the melting point of the tin-lead alloys decreases almost proportionately to the increase of tin, from 619 deg. F., the melting point of pure lead, to 356 deg. F. when the alloy contains 68% of tin, and then increases to 448 deg. F., the melting point of pure tin. Alloys on either side of the 68% mixture begin to soften materially at 356 deg. F. because at that temperature the eutectic alloy melts and permits the whole alloy to soften. This is according to Dr. J. A. Mathews. Therefore, in the making of the matrix, when the alloy foil sheet of the mat is against the type body, such sheet being of the alloy proportions above indicated, under the application of heat at 356 deg. F., or thereabout, the foil sheet, owing to the melting of the eutectic alloy, begins to soften, and at this point will take an exceedingly accurate detail and fine impression of the printing plate, type body or other matter, without, however, flowing too freely. Furthermore, at such a point, only a very low pressure is necessary to produce the impression on the foil sheet with all the vivid detail, and consequently no great crushing pressure need be exerted upon the original body of type or plate. Indeed the pressure is so light, that the back of a thin foil sheet will show little or no embossing effect but if the foil sheet be stripped from the backing sheet, it will appear as shown in Fig. 2 with the depressed surface extending but partway through the foil sheet. At the same time, under this heat and pressure, the phenolic impregnated backing sheet will quickly and thoroughly harden and set, due as aforesaid, to the use of the catalytic agent, such as chlorid of zinc.

Thus, by making my matrix sheet or mat of or with a facing sheet of an alloy of lead and tin in about the proportions recited and backing this up with a backing sheet of fibrous material impregnated with a phenolic substance and treated with a solution containing a catalytic agent, I find that I may dispense entirely with heavy pressures in making the matrix; using less than ordinary printing pressures I will obtain the finest of details as to grain, impression and the like, may make my matrix in far less time than I have heretofore required, and at a very low temperature, will avoid embossing effects and yet will provide a matrix from which the plastic printing plate will readily strip without marring either the plate or the matrix.

What I claim is:

1. A composite sheet having an impression-taking face comprising a sheet of metallic foil composed of an alloy of substantially equal parts of tin and lead.

2. A composite sheet having an impression-taking face composed of a foil sheet of metallic alloy, the melting point of the eutectic alloy of said foil sheet being approximately 356° Fahrenheit.

3. A composite sheet comprising an impression-taking metal face sheet composed of an alloy of tin and lead, and a moldable backing sheet capable of hardening and setting under heat and pressure united with the first sheet.

4. A composite sheet comprising a metallic face sheet, composed of an alloy of tin and lead and a backing sheet united therewith and comprising a fibrous body impregnated with a plastic substance capable of hardening and setting under heat and pressure.

5. A composite sheet having a face sheet composed of a metallic alloy, the melting point of the eutectic alloy of the latter being approximately 356° Fahrenheit, and a backing sheet for the face sheet comprising a body of absorbent material impregnated with a phenolic condensation product capable of hardening and setting under heat and pressure.

6. A composite sheet comprising a face sheet composed of a metallic alloy, and a backing sheet therefor, comprising a fibrous body impregnated with a plastic substance capable of hardening and setting under heat and pressure, and treated with a catalytic agent.

In testimony whereof I have hereunto set my hand.

EMIL E. NOVOTNY.